(No Model.)
T. W. HARRIS.
CONDUIT FOR ELECTRIC OR CABLE RAILWAYS.
No. 394,648. Patented Dec. 18, 1888.
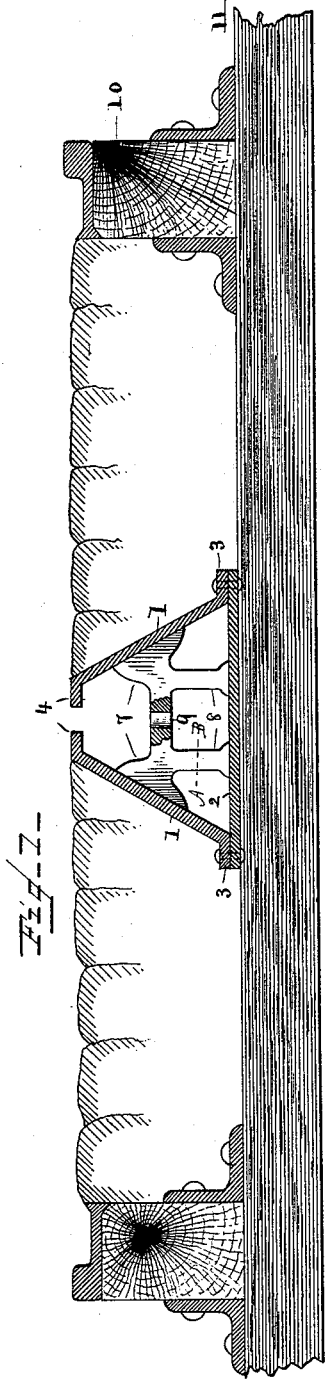
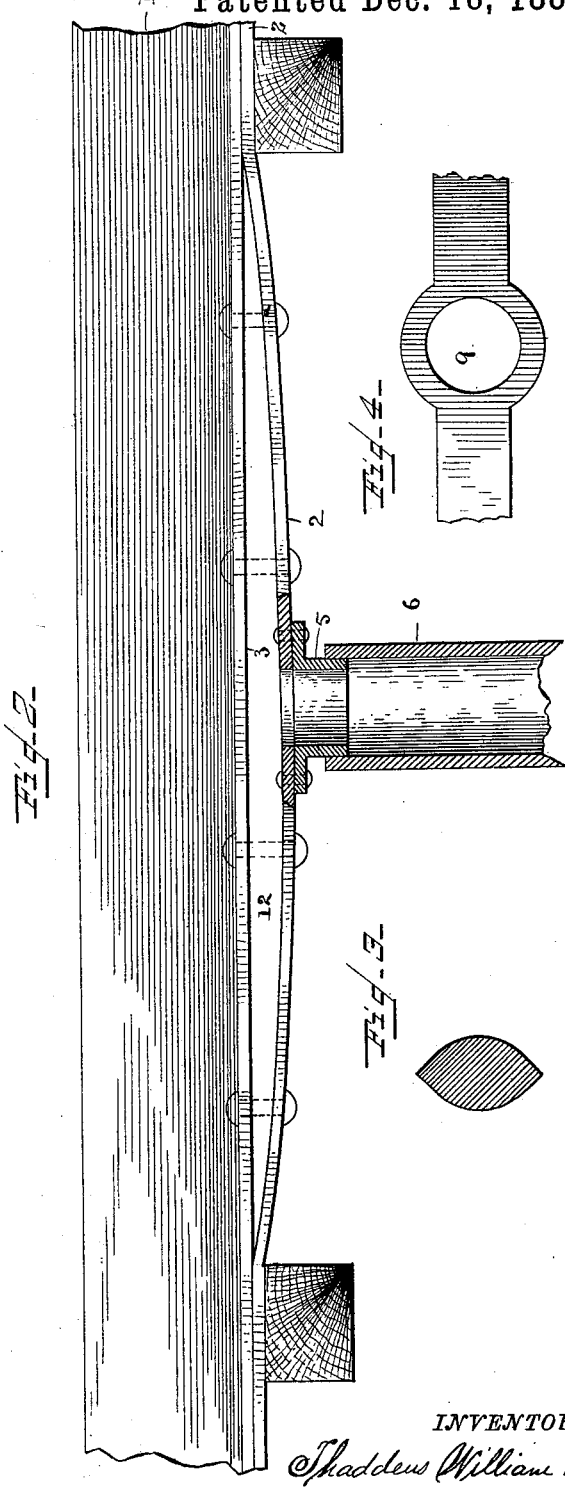
WITNESSES:
Edwin L. Yewell
E. W. B. Phillips
INVENTOR:
Thaddeus William Harris
By E. B. Clark
Attorney.

UNITED STATES PATENT OFFICE.

THADDEUS WILLIAM HARRIS, OF NEW YORK, N. Y.

CONDUIT FOR ELECTRIC OR CABLE RAILWAYS.

SPECIFICATION forming part of Letters Patent No. 394,648, dated December 18, 1888.

Application filed October 22, 1887. Serial No. 253,114. (No model.)

*To all whom it may concern:*

Be it known that I, THADDEUS WILLIAM HARRIS, a citizen of the United States, residing at New York city, in the county of New York and State of New York, have invented certain new and useful Improvements in Conduits for Electric and Cable Railways; and I do hereby declare the following to be a full, clear, and exact description of the invention, such as will enable others skilled in the art to which it appertains to make and use the same.

The invention relates to improvements in underground conduits for electric and cable railways and for other purposes; and it consists in matters hereinafter described, and particularly pointed out in the claims.

In the accompanying drawings, which form part of this specification, Figure 1 represents a transverse section of a roadway and conduit. Fig. 2 represents an exterior side view of the conduit, a part of the bed-plate being broken away and its connection with the drain-pipe shown in section. Fig. 3 represents a section, on an enlarged scale on line A B, Fig. 1, of one of the supporting-legs of a supporting-block; and Fig. 4 represents a plan view, on an enlarged scale, of a central portion of said block, provided with an aperture for the reception of an insulating-support for an electrical conductor.

In the several figures, in which like letters indicate like parts, 1 1 indicate Z-shaped or flanged plates, which are to be securely bolted or riveted to a bottom plate, 2. The plates 1 1 are formed substantially as represented, so that when the bottom flanges of plates 1 1 rest upon plate 2 the main portions of the plates will be inclined toward each other and bring the upper flanges, 4, into proximity, whereby, ordinarily, a space or slot of only from one-half to three-fourths of an inch is left between said flanges. The bottom plate is made of such width that the foot-flanges 3 may rest upon and be secured to it, as shown. These plates are preferably made of metal, such as cast or wrought iron.

At suitable intervals a curved or bent bottom or bed plate, as indicated in Fig. 2, is provided to facilitate the draining of the conduit. A distance piece or block, 12, of a curvature corresponding to the bend in the plate, is inserted on each side between the flanges 3 and the curved bottom or bed plate, and is secured by bolts passing through the bottom plate, the distance-block, and flanges 3. This curved bed-plate has at its lowest point an opening which communicates with a short pipe, 5, that may be formed with or bolted to said plate, and is adapted to make connection with a pipe or conduit, 6, leading to a sewer. These pipes are made to enter one the other in such manner that they can move freely and to a sufficient distance to obviate the danger of separation by the settling of the earth around them or from other causes. In forming this "slip-joint" it is not material which pipe enters the other, though it is preferred that the short section connected to the plate shall enter the other, as shown. These curved bed-plates and drain-pipes can be placed at suitable distances apart to provide ample drainage for the conduit, and they can also be made sufficient to allow the washing or flushing of the conduit to remove dirt that may accumulate therein.

In order to brace the conduit and prevent it from being crushed and to prevent its slot from being closed by the expansive action of freezing water in the upper surface of the street and roadway, a block of rigid metal—such as cast-iron—is placed on the interior. Heretofore braces have been riveted to the conduit-walls for a somewhat similar purpose; but they have been found to be objectionable, partly because they obstructed the conduit too much and interfered with its drainage and with the washing out thereof, and partly because they required to be secured by fastenings to the walls of the conduit, thereby weakening them and adding considerably to their cost, it being necessary to form holes through both the conduit-walls and the braces.

The present invention contemplates a separable block or brace of such form that when it is placed in the conduit and the walls of the latter are secured to each other the block will be securely held without bolts or other fastenings and will be thrust against said walls, so as to effectually support them against external pressure or force. In the form shown the block is provided with two connected shoulders, 7, abutting against the inclined walls of the conduit, and with legs 8, which rest upon the bottom plate, these latter being preferably flattened (see Fig. 3) in the direction of the length of the conduit to diminish the proportionate degree of obstruction to a current of water in the conduit, the whole constituting one inflexible piece.

It is obvious that any external force applied to the sides 1 1 will be powerfully resisted by such a block. Such force, so far as it acts horizontally, will be resisted by the shoulders and their connection, and that part which acts vertically will be resisted by the legs, which are sustained by the bed-plate and its support. The legs, however, might be omitted without sacrificing all the advantages of my improvement, as the block provided with inclined shoulders fitted to the inclined walls 1 1 would be held by said walls and would powerfully oppose any external force. To prevent said block from settling in the conduit during alternate expansions and contractions caused by variations of temperature, ledges or flanges might be provided on walls 1 1, just below the shoulders, in case legs 8 are omitted. The latter, however, are preferred.

The shoulders are connected by a web or body, which may be perforated, as at 9, Figs. 1 and 4, to receive an insulator to support an electric conductor. The conductor or conductors can be supported at either side of the medial line of the conduit, if desired, to remove them from directly beneath the slot. The aperture and the particular form and size of this web or body are not essential.

A convenient means of supporting the conduit and holding it against displacement is illustrated in the drawings. The rails of a car-track are secured to string-pieces or sleepers 10, which in turn are secured by means of angle-irons to cross-ties 11. Underneath and on these ties rest the bed-plates 2 of the conduit, all below the rails being embedded in and below the pavement or road-surface.

Having described my invention, what I desire to claim and secure by Letters Patent is—

1. In a conduit, the combination, with the two flanged side plates inclined toward one another to form the slot, of the detached and removable brace or block having beveled shoulders bearing against and supporting the inclined side plates, and a connecting web or body and downwardly-projecting legs, whereby said brace can be applied and held in operative position without bolts or other fastening devices, substantially as described.

2. The combination of the flanged plates, the bottom plate, and the detached block or brace, substantially as set forth.

3. The combination of the flanged side plates, the curved bed-plate provided with an exit, and the filling or distance pieces, all secured together substantially as set forth, whereby drainage of the conduit is facilitated.

4. The combination of the flanged side plates, the curved bed-plate provided with an exit, the filling-pieces all secured together, and a drain-pipe connected by a slip-joint with a short pipe attached to said bed-plate, substantially as set forth, whereby accidental separation of the pipes is obviated.

5. In a conduit, the combination, with the flanged and inclined side plates and bottom plate having curved or depressed portions and drainage-exits, of brace-blocks, each composed of a web or body, beveled bearing-shoulders, and supporting-legs resting upon each side of the median line of said bottom, whereby a clear channel is left for water to flow into the depressed portion of the bottom, substantially as described.

6. The combination, with the conduit provided with a drainage-exit in its continuous bottom, of a brace or block for the conduit supported in a vertical direction by legs or flanges on each side of the median line of said bottom, made of flattened or oval form in cross-section, substantially as specified.

In testimony whereof I affix my signature in presence of two witnesses.

THADDEUS WILLIAM HARRIS.

Witnesses:
WILLIAM J. WELDON,
JOHN C. ROBINSON.